United States Patent [19]

Nye et al.

[11] 3,776,674
[45] Dec. 4, 1973

[54] APPARATUS TO FORM ELONGATE PLASTIC ARTICLES

[75] Inventors: Norman H. Nye, Cuyahoga Falls; Arthur T. Medkeff, Tallmadge, both of Ohio

[73] Assignees: Nicholas Creme; Cosma Creme, both of Tyler, Tex.

[22] Filed: July 12, 1972

[21] Appl. No.: 271,139

Related U.S. Application Data

[62] Division of Ser. No. 64,946, Aug. 19, 1970, Pat. No. 3,711,589.

[52] U.S. Cl. ............ 425/134, 425/130, 425/261
[51] Int. Cl. ........................................... B29c 9/00
[58] Field of Search ............. 425/130, 132, 134, 425/92, 257, 261, 447, 449, DIG. 9

[56] References Cited
UNITED STATES PATENTS

| | | | |
|---|---|---|---|
| 3,060,499 | 10/1962 | Nye et al. ......................... | 425/261 |
| 2,850,990 | 9/1958 | Rasmusson ..................... | 425/134 X |
| 1,711,750 | 5/1929 | Schoppner ........................ | 425/132 |
| 1,168,305 | 1/1916 | Hood ................................ | 425/132 |
| 2,031,386 | 2/1936 | Rapisarda ......................... | 425/130 |
| 2,485,322 | 10/1949 | Schwartz .......................... | 425/130 X |

*Primary Examiner*—Robert L. Spicer, Jr.
*Attorney*—Vern L. Oldham et al.

[57] ABSTRACT

Apparatus for making elongated multi-colored articles from a plastic material including means to move a series of molds through a fixed path, two members one for depositing a controlled amount of heated liquid plastic material of one color into one end portion of each of the molds and a second for depositing a controlled quantity of a heated liquid plastic material of a second color in overlapping relation to a portion of the first material to fill the remainder of the mold cavity with the second material. The two members for providing controlled discharge of regulated amounts of the two plastic materials are positioned in immediate association with each other for prompt discharge of the second material in the mold cavity after the first material has been introduced into the mold and they include a plurality of substantially vertically extending control links positioned adjacent a pair of discharge head assemblies present in the apparatus.

4 Claims, 6 Drawing Figures

APPARATUS TO FORM ELONGATE PLASTIC ARTICLES

RELATED U.S. APPLICATION

This is a division of our prior application Ser. No. 64,946, filed Aug. 19, 1970, now U.S. Pat. No. 3,711,589.

The present invention relates to the production of elongated plastic articles, such as artificial fish worms, or the like.

BACKGROUND OF THE INVENTION

Heretofore there has been apparatus provided for making elongated plastic articles, such as artificial fish worms, in quantity by easily controlled, efficient, practical apparatus and one of such previous structures is shown in our previous U.S. Pat. No. 3,060,499. Such apparatus functions effectively to make single color plastic articles. However, in many areas or for various reasons, it is desired to provide multi-colored elongate plastic articles, and particularly artificial fish worms wherein the head portion of the worm or article is of one color and the remaining trailing end portion is made from a second color, usually contrasting with the color of the head end portion of the article.

The general object of the present invention is to provide novel and improved apparatus and method for making elongate, multicolored plastic articles by a compact, substantially automatic functioning apparatus and a method serving to provide unitary multicolored plastic articles.

Another object of the invention is to deposit controlled amounts of different colored plastic materials into axially overlapped portions of an open top mold cavity for formation of a unitary multicolored elongate plastic article therein.

A further object of the invention is to provide a relatively compact apparatus which can be readily maintained, operated and serviced, and which apparatus has a plurality of plastic discharge heads therein and with the apparatus being readily available for access to the discharge heads and components thereof.

Yet another object of the invention is to provide an improved automatic method of making two color plastic articles, such as fish worms, and to provide maintenance free, relatively inexpensive apparatus for producing such articles.

The foregoing and other objects and advantages of the invention will be made more apparent as the specification proceeds.

When referring to corresponding members shown in the drawings and referred to in the specification, corresponding numerals are used to facilitate comparison therebetween.

Reference now is particularly made to the accompanying drawings, wherein.

INVENTIVE SUBJECT MATTER

Figure 1:
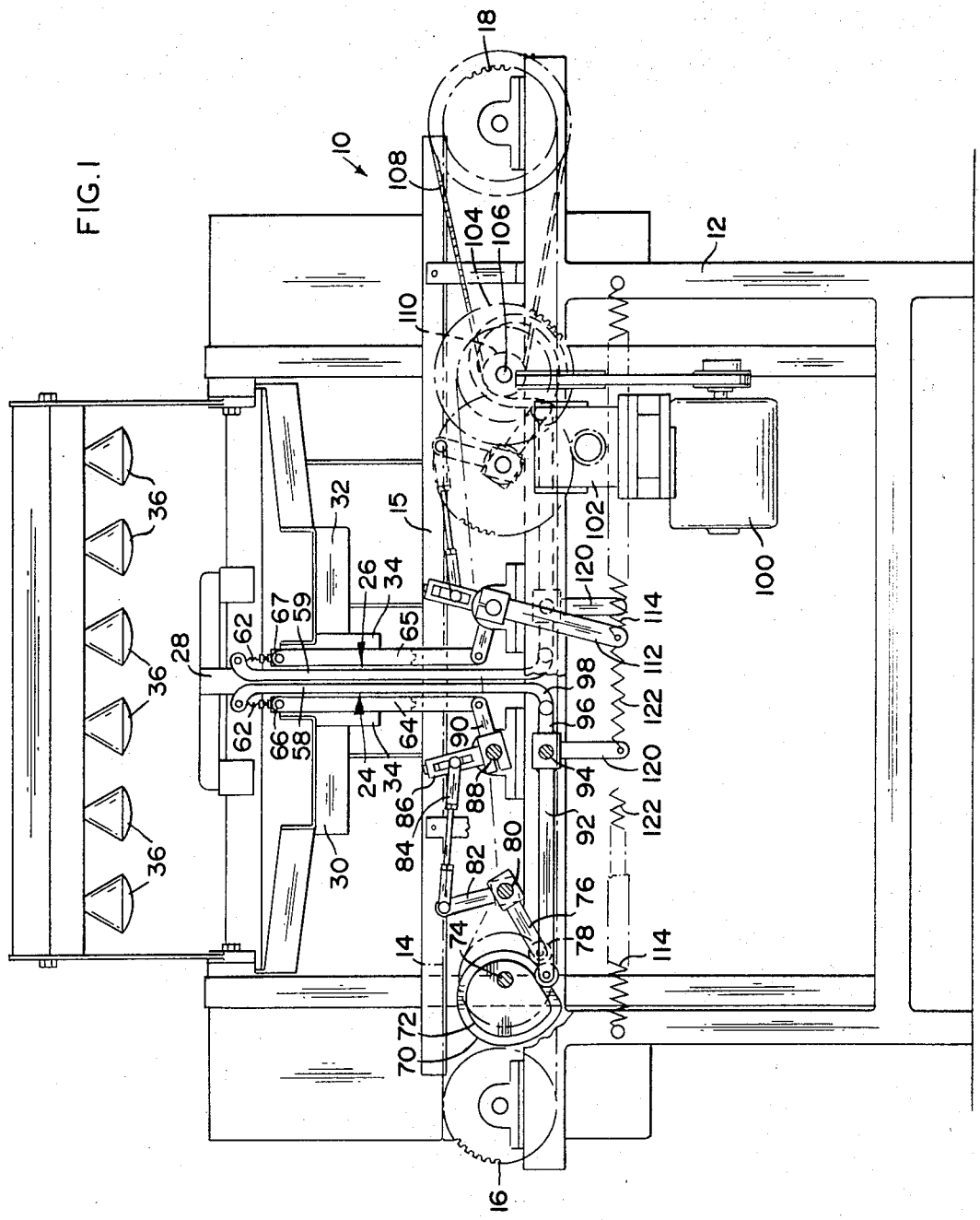
FIG. 1 is a side elevation of a machine embodying the principles of the invention with portions of the machine being broken away and shown in vertical cross section.

The present invention, as one embodiment thereof, comprises an improvement in the art for depositing controlled amounts of different colored plastic materials into axially overlapping portions of an open top mold cavity while the plastic material is in a heated or unset condition to form a unitary multi-colored plastic article. Means for producing the multi-colored plastic articles are provided and they include a pair of discharge heads or assemblies positioned in immediately adjacent relationship with each other for depositing controlled amounts of different colored plastic materials, when heated and liquid, into the same mold cavity to form a unitary article, and improved control means are provided including a plurality of substantially vertically extending links positioned adjacent the discharge heads for controlling the operation of the discharge heads but yet leaving the center portion of the apparatus open for inspection, repair, servicing and adjustment.

Attention now is particularly directed to the details of the structure shown in the drawing, and a plastic depositing and article forming apparatus of the invention is indicated as a whole by the numeral 10. This apparatus 10 includes a suitable frame 12 which positions an endless conveyor 14 as by pairs of sprockets 16 and 18 journalled at opposite ends of the frame 12 whereby the conveyor moves longitudinally of the frame 12 and has an upper and lower course thereon. The conveyor 14 is adapted to have a plurality of elongate molds 20 secured to axially spaced portions thereof and with each of the molds 20 having an elongate cavity or parallel transversely spaced cavities or irregular contour 22 provided therein. The cavities 22 are of the shape of the articles to be produced.

It is a feature of the invention that a pair of plastic deposit means or devices 24 and 26 are positioned in back to back relation adjacent a center portion of the frame 12 including an upwardly extending frame section or means 28 to which the plastic deposition means 24 and 26 can be operably secured in association with other portions attached to the frame 12, as desired.

The plastic deposition means are substantially identical in construction but with reversal of component positions to enable them to be positioned in an immediately adjacent relationship for plastic discharge purposes. Since one of these members is almost a duplicate of the other, the details of one of the members will be primarily described and the controls and functioning of the second plastic deposition means is a duplicate, in reverse, of the members described. Hence, a plastic receiving tray 30 is part of the plastic deposition means 24 and a similar tray 32 is provided for the means 26. These trays are adapted to receive the thermoplastic material for use in the process of the invention therein and the trays are provided with lowermost portions 34 positioned adjacent the center frame 28. Any suitable means, such as infra-red lights 36, are positioned above the trays 30 and 32 for heating and/or melting the thermoplastic material placed therein and aiding it in its flow to the lower tray section 34. Such lights are provided in sufficient number and of the proper size to have the plastic material molten and readily flowable for processing in the apparatus of the invention. This plastic material will normally be some type of a vinyl plastisol resin or equivalent material that is adapted to be first melted by the application of heat thereto and ultimately to be set at room temperature either by a chemical set up action or by solidification of the thermoplastic material, as desired. Any convention compounding ingredients may also be present in the material present in the trays 30 and 32.

Since it is a feature of the invention that two different colors of plastic material are used to make the article, different colored compositions are present in the trays 30 and 32. The desired articles can be obtained from the open top mold cavities provided.

The upper course of the conveyor 14 may be controlled by suitable guides or angles 15 shown in the drawings to lead this upper course of the conveyor through a fixed path in the apparatus immediately below the plastic deposit means 24 and 26.

The plastic deposition means comprises a nozzle 38 and a nozzle 40 individually connected to the lowermost sections 34 of the individual trays and a control piston or plunger 42 and 44 is received in a discharge cylinder 46 and 48. respectively, connecting to the tray sections 34 and to the individual nozzles 38 and 40. In addition, needle valves 50 and 52, respectively, are received on the axes of both of the nozzles 38 and 40 for closing the same and with such needle valves including extensions or sections 54 that extend up vertically above the plungers 42 and 44, being sealed in engagement therewith by conventional means such as packings and gland means 56.

Figure 2:
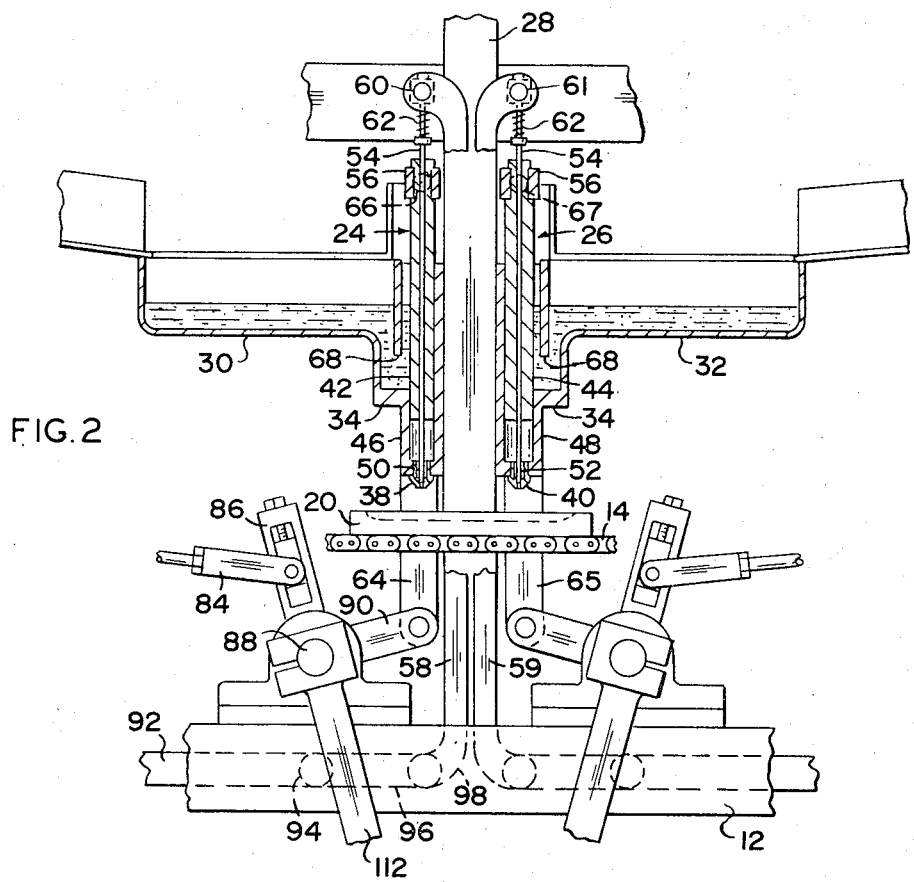
FIG. 2 is a fragmentary vertical section through the center portion of the machine, shown in enlarged detail, with portions of the machine broken away for clarity.

FIG. 2 of the drawings best shows that a pair of control links or arms 58, 59 are provided adjacent and between the sides of the center frame section 28 and with an individual cross bar 60 or 61 extending between the upper ends of these pairs of control links 58, or 59 whereby the individual needle valves 50 and 52, by the upper section 54 thereof, are individually connected to the cross bars 60 and 61, respectively. These connection means usually are vertically adjustable and with the needle valves being urged downwardly at all times by coil springs 62 or the like. Thus, vertical movement of the control links 58 and 59 needs be only of a limited extent but will serve to move the needle valve 50 and 52 into or out of sealing engagement with nozzles 38 or 40, respectively.

Likewise, a second set of pairs of control links 64, 65 extend vertically in the apparatus at each side thereof and they are substantially parallel to the control link 58 and 59. Pairs of such control links 64,64 or 65,65 operatively engage a cross bar 66 or 67 connected between the second pairs of control links. The cross bars 66 or 67 are operatively secured to the upper ends of each of the plungers 42 or 44, for the individual discharge units. Movement of the plungers by the control links is sufficient in a vertical direction as to pull plastic material in to the cylinders 46 and 48 by raising the plungers above the inlets 68 provided in the cylinders. For discharge of controlled quantities of the liquid plastic material, vertical downward movement of the control links 64 and 65, transmitted through the bar 66 to the different plungers, is provided. As in the previous patent referred to hereinabove, usually a plurality of mold cavities are present in parallel side by side relationship and thus a corresponding plurality of the individual cylinders 46 and 48 are provided and with the nozzles 38 and 40 being positioned directly vertically above each of the different mold cavities 22 as moved by the conveyor 14.

So as to control vertical reciprocating action of the pairs of the control links 58,58 and 64,64 etc. a pair of cams 70 and 72 are secured to a transversely extending shaft 74 suitably journalled on an upstream portion of the frame 12. The control for the set of control links 64 comprises the cam 70 which has a cam follower 76 operatively engaging it by a cam roller 78 thereon which can follower is secured to a second transversely extending shaft 80 suitably journalled on the frame and with the cam follower 76 being fixedly secured to such shaft. A second link or arm 82 is also fixedly secured to the shaft 80 and extends substantially vertically upwardly therefrom. In turn, this link 82 pivotally engages an adjustable connector 84 secured at its other end to a control arm 86. The control arm 86 is fixedly secured to another transversely extending shaft 88 also suitably journalled on the frame 12. A second arm 90 fixedly extends from the shaft 88 and is in fixed radial relationship to the arm 86. Such arm or final link 90 suitably connects to the lower end of the control links 64,64 to move them vertically in the apparatus for control actions as outlined hereinbefore. Any conventional adjustment means may be provided in the connection of the connector 84 to the control arm 86 for varying the arcuate movement provided through action of the cam 70.

Figure 3:
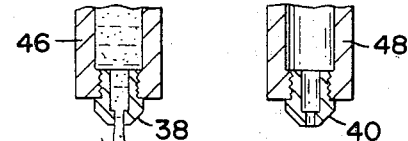
FIG. 3 is a fragmentary enlarged section showing the initial method step in the deposit of a plastic material into a mold.
Figure 4:
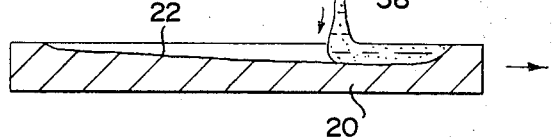
FIG. 4 is a vertical section through the mold after receipt of the material as shown in FIG. 3.
Figure 6:
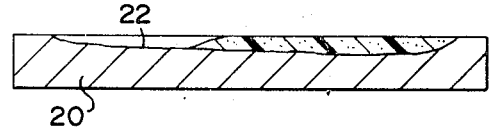
FIG. 6 is a vertical cross section through the elongate plastic article produced in the mold and by the method of the invention.
Figure 5:
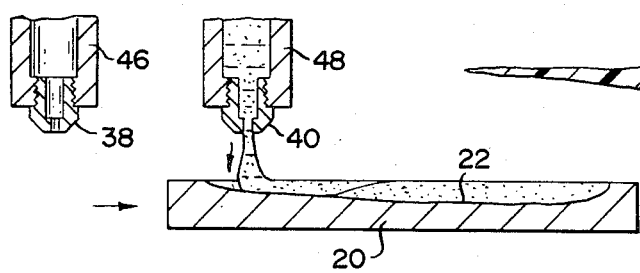
FIG. 5 shows the next step in the progressive filling of the mold of FIGS. 3 and 4.

Likewise, the cam 72 has a cam follower 92 operably engaged therewith and positioned on a transversely extending shaft 94 journalled on lower central portion of the paparatus. This shaft 94 has a short connector link 96 extending therefrom at each side of the apparatus and fixedly secured thereto for pivotal connection with a curved lower end 98 of individual ones of the set of control links 58. Hence, control action of the cam 72 will provide a slight vertical movement of the free end of the elongate cam follower 92 and provide desired vertical oscillation of the links 96 whereby the control links 58 can be raised and lowered a short distance for opening and closing the needle valves 50 and 52 in relation to the nozzle 38 and 40 at timed intervals. By the mechanism described and proper cam design, a controlled or desired amount of plastic material of one color can be initially deposited in the leading end of the mold as it moves under the nozzle 38 as indicated in FIG. 3. This deposit of a controlled amount of material then is terminated and a slightly tapered end is provided on the material as indicated in FIG. 4. However, before such material has completely set, a deposit of a controlled amount of a second plastic material is provided in axially overlapping relationship to the elongate first material deposit. Such action is shown in FIG. 5 by the nozzle 40. Then the time of movement of the molds through a fixed path under ambient temperature conditions is enough to set the plastic material and provide the elongate articles, as desired. The articles stick in the molds until taken therefrom as at the upstream end of the upper course of the conveyor. However, these articles are of multi-color and desired shape and have an axially overlap or bond between the deposited materials to aid in producing a satisfactory strength in the ultimate unitary two color article.

A very attractive article, such as a fish worm, has been provided and these articles can be made in good quality at low cost.

Any desired type of drive can be provided for the apparatus and ussulay it comprises a motor 100 connected by a suitable speed reducing member 102 to drive a gear 104 carried on a shaft 106 in the apparatus. Then a connecting drive chain 108 extends from a suitable sprocket 110 on this shaft and engages sprocket on the ends of the shafts mounting the conveyor 14. All drive is taken from the conveyor by engaging it positively with the other transversely extending shafts in the apparatus whereby a positive but controlled drive action is realized in the apparatus.

To maintain the cam followers in engagement with the cams 70 and 72, an arm 112 extends downwardly from the shaft 88 and engages a spring 114 attached at one end to the frame 12. Also, an arm 120 secured to the shaft 94 extends downwardly therefrom. A spring 122 is connected between the frame and such arm 120. These tension springs hence are out of the path of the conveyor and are below the other parts of the apparatus. The control arms 90 and 96 are positioned transversely outwardly of the conveyor 14 to engage the respective vertically extending control links on each side of the apparatus.

The controls for the discharge or deposit means 26 are like those described for the means 24.

The plastic material in the trays 30 and 32 usually is the same basic material with color or other compounding differences. But any compatible materials may be used. The second material should be deposited in overlapped relation to the first material promptly after deposit of the first material.

By the apparatus of the invention and the method of plastic deposit, a novel, improved product has been obtained by an easily practiced automatic method of production.

While one complete embodiment of the invention has been disclosed herein, it will be appreciated that modification of this particular embodiment of the invention may be resorted to without departing from the scope of the invention.

What is claimed is:

1. Apparatus for making elongated multi-colored articles from a plastic material comprising
   a frame having a center section thereon operably positioned above other portions of the frame,
   a plurality of open top cavity molds secured to a conveyor means for movement through a fixed path on said frame and including an upper course passing below said frame center section,
   a pair of plastic discharge means positioned on said frame center section above and spaced along said fixed source so that each discharge means of said pair may deposit material into said mold cavities,
   at least one control link means for each of said discharge means to control discharge of material therefrom and
   means to actuate said control link means in timed relation to movement of said molds for alternate sequential deposit of material from each of said discharge means into each said cavity in overlapped portions.

2. Apparatus for making elongated multi-colored articles from a plastic material as in claim 1 including
   means to provide each of said discharge means with a flowable plastic material,
   each of said dischage means including a material receiving cylinder, a discharge plunger, a discharge valve and a needle valve to open and close said discharge valve,
   a pair of control link means being provided for each of said discharge means and individually engaging a said discharge plunger and a said needle valve, respectively, for vertical movement thereof, said control link means being substantially parallel to each other and being positioned laterally outwardly of said frame center section.

3. Aparatus as in claim 2 and including said mold cavities being elongated, said discharge means being spaced apart a shorter distance than the length of said mold cavities, said last-named control link means and discharge means cooperating for deposit of material in overlapping relation into each of said cavities.

4. Apparatus as in claim 2 where said discharge means are positioned in back to back relation and extend in opposite directions from said frame center section, and
   said control link means are vertically positioned members having vertical movement and connecting directly to said discharge plunger and to said needle valve for vertical movement thereof of control discharge of material from said discharge means.

* * * * *

UNITED STATES PATENT OFFICE
CERTIFICATE OF CORRECTION

Patent No. 3,776,674　　　　　　　　Dated　　December 4, 1973

Inventor(s)　Norman H. Nye and Arthur T. Medkeff

It is certified that error appears in the above-identified patent and that said Letters Patent are hereby corrected as shown below:

Column 2, line 41, change "or" to --of--.

Column 3, line 11, change "convention" to --conventional--.

Column 3, line 54, change "link" to --links--.

Column 4, line 38, change "paparatus" to --apparatus--.

Column 5, line 7, change "ussulaly" to --usually--.

Column 6, line 8, change "source" to --course--.

Column 6, line 22, change "dischage" to --discharge--.

Column 6, line 33, change "Aparatus" to --Apparatus--.

Column 6, line 46, change "of" to --to--.

Signed and sealed this 16th day of April 1974.

(SEAL)
Attest:

EDWARD M.FLETCHER,JR.　　　　　　　C. MARSHALL DANN
Attesting Officer　　　　　　　　　　Commissioner of Patents